United States Patent
Huang et al.

(10) Patent No.: US 9,740,266 B2
(45) Date of Patent: Aug. 22, 2017

(54) APPARATUS AND METHOD FOR CONTROLLING MULTI-CORE OF ELECTRONIC DEVICE

(71) Applicant: MediaTek Inc., Hsin-Chu (TW)

(72) Inventors: Shih-Chieh Huang, New Taipei (TW); Chun-Hsiung Hu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 10 days.

(21) Appl. No.: 14/845,922

(22) Filed: Sep. 4, 2015

(65) Prior Publication Data

US 2017/0068297 A1    Mar. 9, 2017

(51) Int. Cl.
  *G06F 1/32*    (2006.01)

(52) U.S. Cl.
  CPC .......... G06F 1/3206 (2013.01); G06F 1/324 (2013.01); G06F 1/3287 (2013.01)

(58) Field of Classification Search
  CPC .............................. G06F 1/324; G06F 1/3287
  USPC ......................................... 713/320, 322, 324
  See application file for complete search history.

(56) References Cited

U.S. PATENT DOCUMENTS

| | | | |
|---|---|---|---|
| 7,647,519 B2 * | 1/2010 | Heller, Jr. ............. | G06F 1/3287 713/300 |
| 8,191,062 B2 | 5/2012 | Grobman | |
| 8,595,527 B2 * | 11/2013 | Chung ................. | G06F 1/3203 713/322 |
| 8,650,426 B2 * | 2/2014 | Rychlik ................ | G06F 1/3203 713/323 |
| 8,904,199 B2 * | 12/2014 | Han ........................ | G06F 1/324 713/300 |
| 8,904,211 B2 * | 12/2014 | Mondal ................. | G06F 1/3206 713/320 |
| 8,984,523 B2 * | 3/2015 | Vajda .................... | G06F 9/4893 713/320 |
| 9,354,943 B2 * | 5/2016 | Bose ..................... | G06F 9/5094 |
| 2006/0095807 A1 * | 5/2006 | Grochowski ........... | G06F 1/206 713/324 |

(Continued)

OTHER PUBLICATIONS

Chang, Y.M., et al.; "A Resource-Driven DVFS Scheme for Smart Handheld Devices;" ACM Transactions on Embedded Computing Systems; vol. 13; No. 3; Article 53; Dec. 2013; pp. 53:1-53:22.

(Continued)

*Primary Examiner* — Chun Cao
(74) *Attorney, Agent, or Firm* — McClure, Qualey & Rodack, LLP

(57) ABSTRACT

An electronic device includes a plurality of processor cores, a core controller, and a core setting module. The processor cores are for executing an application program. The core controller monitors a degree of parallelism of the application program; determining, according to utilization of the processor cores, whether frequencies of the processor cores or power-on number of the processor cores should be changed; and selects, according to the degree of parallelism of the application program, at least one of the frequencies of the processor cores and the power-on number of the processor cores to provide a selection result when determining that the frequencies of the processor cores or the power-on number of the processor cores should be changed. The core setting module changes at least one of the frequencies of the processor cores and the power-on number of the processor cores based on the selection result.

13 Claims, 7 Drawing Sheets

(56) References Cited

U.S. PATENT DOCUMENTS

| | | | | |
|---|---|---|---|---|
| 2006/0101464 A1* | 5/2006 | Dohrmann | ............ | G06F 9/5066 |
| | | | | 718/100 |
| 2010/0299541 A1* | 11/2010 | Ishikawa | ............... | G06F 1/3228 |
| | | | | 713/300 |
| 2011/0072295 A1* | 3/2011 | Shahidi | ................. | G06F 1/3203 |
| | | | | 713/340 |
| 2012/0260258 A1* | 10/2012 | Regini | ................. | G06F 9/5094 |
| | | | | 718/104 |
| 2013/0227326 A1* | 8/2013 | Gwak | ................... | G06F 1/3287 |
| | | | | 713/324 |
| 2014/0237274 A1* | 8/2014 | Murakami | .................... | 713/320 |

OTHER PUBLICATIONS

Lin, S.W.G.; "Android Application Level CPU DVFS Tuning;" Dissertation from University of California; 2014; pp. 1-61.

Mittal, T., et al.; "Optimized CPU Frequency Scaling on Android Devices Based on Foreground Running Application;" Feb. 2013; pp. 1-8.

Tseng, P.H., et al.; "User-Centric Energy-Efficient Scheduling on Multi-Core Mobile Devices;" Jun. 2014; pp. 1-6.

* cited by examiner

APPARATUS AND METHOD FOR CONTROLLING MULTI-CORE OF ELECTRONIC DEVICE

BACKGROUND OF THE INVENTION

Field of the Invention

The invention relates generally to a method and an apparatus for controlling operation of a plurality of processor cores within an electronic device, and more particularly, to a method for controlling operating frequencies and on/off of processor cores within an electronic device, and an apparatus thereof.

Description of the Related Art

Employing multiple processors to execute different portions of one or more computer programs in parallel on different processors has become increasingly prevalent as computation complexity increases. To this end, current microprocessors normally integrate multiple processing cores in contrast to several years ago when single core microprocessors are the rule.

While the benefit of multi-core processing is well-known, efficient management of the multi-core is sometimes a very complicated job. The challenge lies in determining how many cores should be turned on to exploit the proper degree of parallelism and under what clock frequency the turned-on cores should operate at. There is always a tradeoff between number of turned-on cores and their working frequencies given the limited power budget. The former give theoretical much more computation capability but in lack of peak performance, while the latter boost its peak performance but incurs heat dissipation problem and therefore limit the number of cores that can be turned on. Thus, it is desirable to devise a robust and efficient approach for managing the operating frequencies and on/off of the multi-core.

BRIEF SUMMARY OF THE INVENTION

An electronic device, a multi-core operation control method and a non-transitory computer-readable storage medium are provided. An exemplary embodiment of the electronic device comprises a plurality of processor cores, a core controller, and a core setting module. The processor cores are configured for executing an application program. The core controller is configured for doing the following: monitor a degree of parallelism of the application program; determine, according to utilization of the processor cores, whether frequencies of the processor cores or number of power-on processor cores should be changed; and select, according to the degree of parallelism of the application program, at least one of the frequencies of the processor cores and the power-on number of the processor cores to provide a selection result when determining that the frequencies of the processor cores or the power-on number of the processor cores should be changed. The core setting module is configured for changing at least one of the frequencies of the processor cores and the power-on number of the processor cores based on the selection result.

An exemplary embodiment of the multi-core operation control method for controlling processor cores that executes an application program is provided. The multi-core operation control method comprises the steps of: monitor a degree of parallelism of the application program; determine, according to utilization of the processor cores, whether frequencies of the processor cores or power-on number of the processor cores should be changed; select, according to the degree of parallelism of the application program, at least one of the frequencies of the processor cores and the power-on number of the processor cores to provide a selection result when determining that the frequencies of the processor cores or the power-on number of the processor cores should be changed; and change at least one of the frequencies of the processor cores and the power-on number of the processor cores based on the selection result.

An exemplary embodiment of the non-transitory computer-readable medium storing therein a control program is provided. The control program when executed causes an electronic device, which includes a plurality of processor cores for running an application program, to execute a process comprising the steps of: monitor a degree of parallelism of the application program; determine, according to utilization of the processor cores, whether frequencies of the processor cores or power-on number of the processor cores should be changed; select, according to the degree of parallelism of the application program, at least one of the frequencies of the processor cores and the power-on number of the processor cores to provide a selection result when determining that the frequencies of the processor cores or the power-on number of the processor cores should be changed; and change at least one of the frequencies of the processor cores and the power-on number of the processor cores based on the selection result.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Various embodiments of the invention are described with reference to the accompanying drawings in detail. The same reference numbers are used throughout the drawings to refer to the same or like components. These embodiments are made for the purpose of illustrating the general principles of the invention and should not be taken in a limiting sense. Detailed description of well-known functions and structures are omitted to avoid obscuring the subject matter of the invention.

The electronic device according to an embodiment of the invention may be implemented as a terminal including a multi-core, including a Personal Digital Assistant (PDA), a smart phone, a tablet Personal Computer (PC), a Portable Multimedia Player (PMP), an electronic book terminal, a notebook PC, a netbook computer, and an UltraMobile Personal Computer (UMPC).

Figure 1:
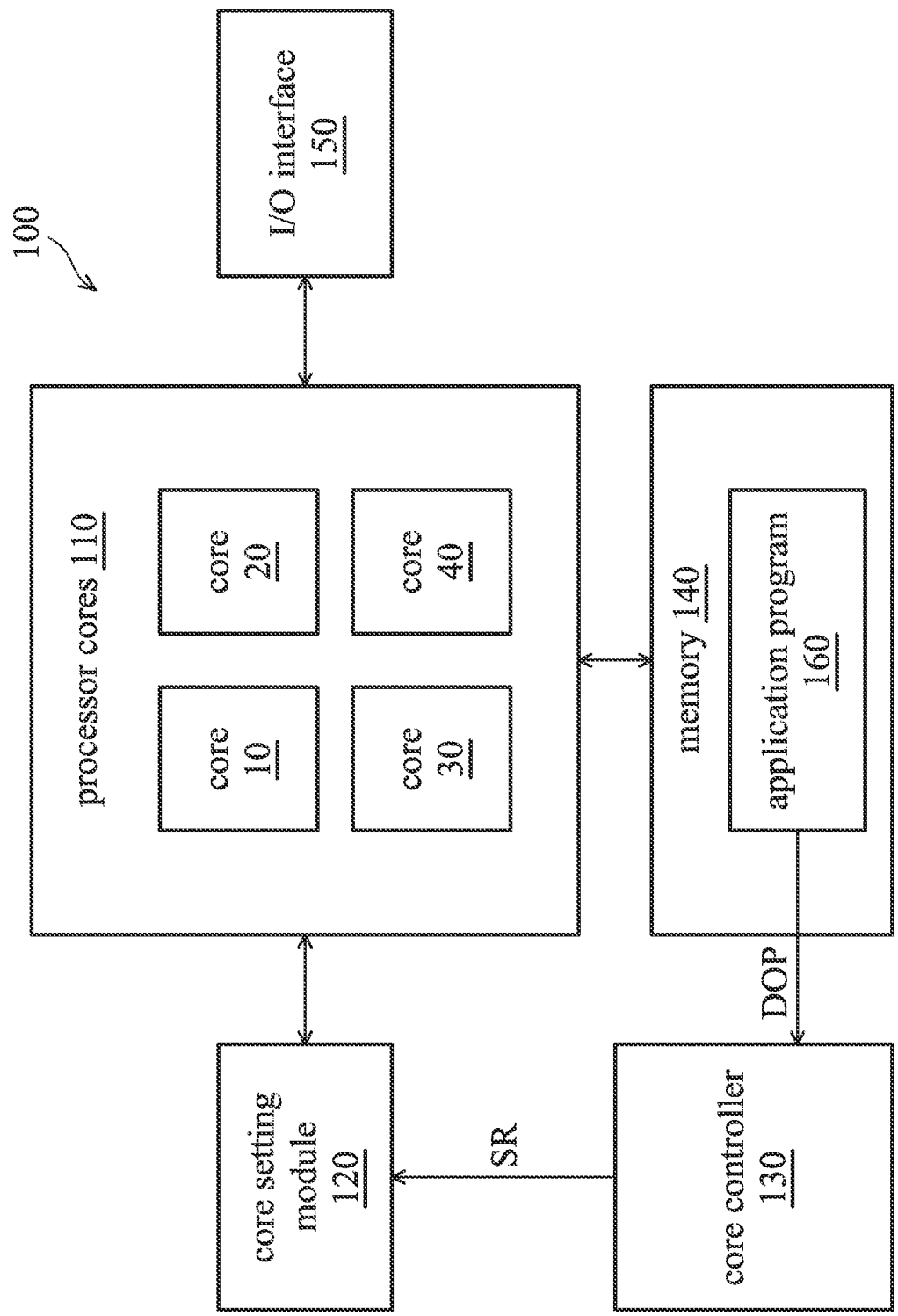
FIG. 1 is a block diagram illustrating a configuration of an electronic device including a multi-core according to an embodiment of the invention.
Figure 2:
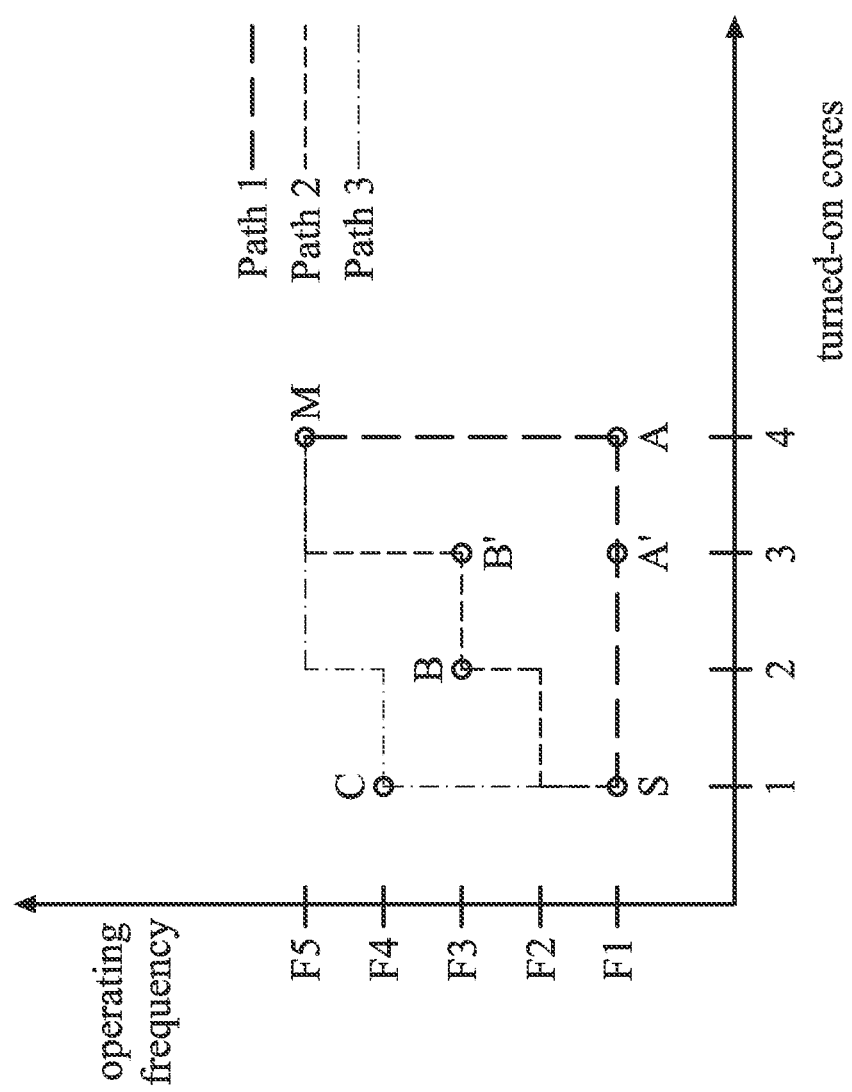
FIG. 2 illustrates how frequencies and on/off of the multi-core may be changed according to some embodiments of the invention.

FIG. 1 is a block diagram illustrating a configuration of an electronic device including a multi-core, according to an embodiment of the invention; FIG. 2 and FIG. 3 illustrate how frequencies and on/off of the multi-core may be changed according to some embodiments of the invention. The following description assumes that the electronic device according to the embodiments of the invention includes quad-cores as one example, but is not limited thereto, and is applicable to an electronic device including a plurality of CPU cores, GPU cores, or any combination thereof, such as a heterogeneous computing device.

Referring to FIG. 1, the electronic device 100 according to an embodiment of the invention includes a plurality of processor cores 110, a core setting module 120, a core controller 130, a memory 140, and a user interface 150. An application program 160 is loaded to the memory 140 to be executed by the processor cores 110, which includes four cores 10, 20, 30, and 40. The application program 160 may include, but not limited to, wireless phone call applications, global positioning satellite (GPS) applications, e-mail applications, calendar applications, entertainment applications that support audio and/or video, etc. In practice, one or more application programs may be simultaneously executed on one or more of the four cores 10, 20, 30 and 40.

The User interface 150 displays information to the user as well as various menus. That is, the User interface 150 provides various screens, for example, an idle screen (home screen), a menu screen, a message creation screen, a call screen, a schedule managing screen, an address book screen, and a web page output screen. The User interface 150 may be a Liquid Crystal Display (LCD), an Organic Light Emitted Diode (OLED), or an Active Matrix Organic Light Emitted Diode (AMOLED) and may be configured in the form of a touch screen to receive inputs from a user.

In one embodiment, the core controller 130 works in combination with the core setting module 120 to control operations of the processor cores 110. The core controller 130 performs functionality of frequency governor and hot plug module to determine operating frequencies and power-on number (how many among the cores 10, 20, 30 and 40 should be turned on) of the processor cores 110. The core setting module 120 sets the processor cores 110 accordingly as well as schedule work tasks received from the application program 160 for sending to the processor cores 110 for execution.

Each module 130 and 120 may comprise software which is executed by the processor cores 110 for monitoring and controlling workflow for the cores 10, 20, 30 and 40. However, each module 130 and 120 may also be formed from hardware and/or firmware as understood by one of ordinary skill in the art. While the core controller 130 is illustrated as a separate module relative to the core setting module 120, these two modules 130 and 120 may be formed into a single unitary module.

The core controller 130 monitors the degree of parallelism DOP of the application program 160. Before or during execution, the application program 160 may indicate an ability for exploiting parallelism (e.g. to use a plurality of threads concurrently for program execution). As is generally understood in the art, the degree of parallelism DOP represents the number of portions of the application program 160 that may be substantially scheduled separately and executed independently on different cores of the processor cores 110. For instance, when the DOP is 4 it means that the application program 160 are divided into four independent tasks for executing concurrently on four different cores of the processor cores 110. The core controller 130 may monitor the degree of parallelism DOP by sampling data from a run queue where portions of the application program 160 are stored. Or, the core controller 130 may issue forth an inquiry to the application program 160 for getting the degree of parallelism DOP.

The core controller 130 further determines whether frequencies of the processor cores 110 or power-on number of the processor cores 110 should be changed according to utilization of the processor cores 110. Core utilization is typically calculated by detecting if the core is halted when a periodic timer interrupt on the platform is fired. For a multi-core like the processor cores 110, the utilization may be the average utilization of all the power-on cores. In one embodiment, the utilization of the processor cores 110 is obtained by the cores setting module 120, which then forwards (not drawn) the utilization to the core controller 130.

In one embodiment, when the utilization of the processor cores 110 is above a predefined threshold, e.g. 90%, the core controller 130 determines that the frequencies of the processor cores 110 or the power-on number of the processor cores 110 should be increased (e.g. to enhance system performance). In another embodiment, when the utilization of the processor cores 110 is below a predefined threshold, e.g. 50%, the core controller 130 determines that the frequencies of the processor cores 110 or the power-on number of the processor cores 110 should be decreased (e.g. to avoid waste of computing resource). In still another embodiment, if the utilization of the processor cores 110 falls within a particular region, the core controller 130 determines that the frequencies of the processor cores 110 or the power-on number of the processor cores 110 should not be changed.

When it is determined that the frequencies of the processor cores 110 or the power-on number of the processor cores 110 should be changed, the core controller 130 selects, according to the degree of parallelism DOP of the application program 160, at least one of the frequencies of the processor cores and the power-on number of the processor cores 110 to provide the selection result SR. The selection result SR indicates which one or both the frequencies of the processor cores and the power-on number of the processor cores 110 should be changed and how the change should be made. For one example, the selection result SR indicates the frequencies of the processor cores 110 should be increased by 100 MHz while the power-on number of the processor cores 110 remains unchanged. For another example, the selection result SR indicates the power-on number of the processor cores 110 should be increased from 1 to 3 (i.e. two more cores should be turned on) while the frequencies of the processor cores 110 remain unchanged.

FIGS. 2 and 3 give several examples to illustrate how the selection result SR is provided by the core controller 130. In these examples, it is assumed that the processor cores 110 begin with one core (i.e. core 10) being turned on at operating frequency F1. Besides, an implicit assumption is that the operating frequencies for all the turn-on cores are the same. These assumptions are made only for the ease of illustration and the invention should not be limited thereto.

Figure 3A:
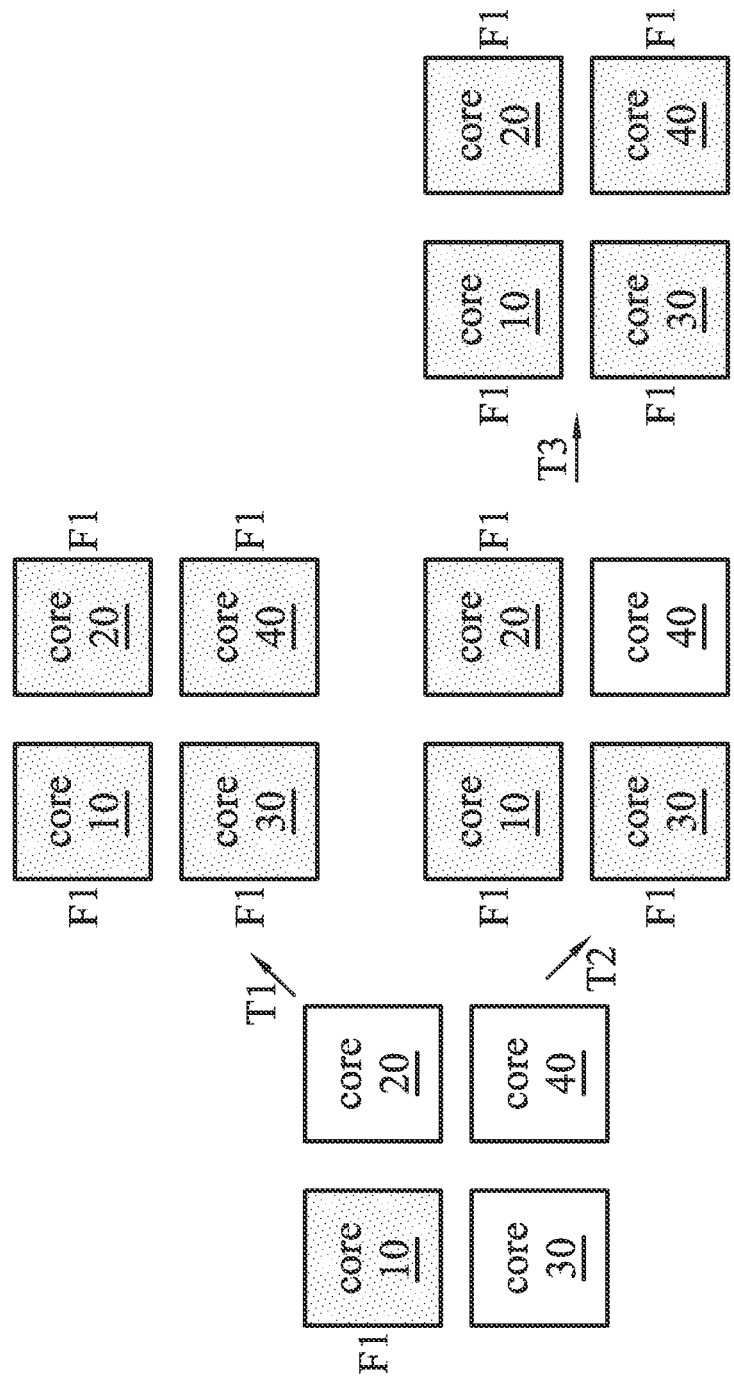
FIGS. 3A, 3B and 3C illustrate how frequencies and on/off of the multi-core may be changed according to some embodiments of the invention.

Please turn attention to path 1 of FIG. 2 in view of FIG. 3A. Path 1 shows a strategy of the core controller 130 for providing the selection result SR when the degree of parallelism DOP is higher than or equal to, say, 4. Under this situation, the core controller 130 adjusts the power-on number of the processor cores 110 before adjusting the frequencies of the processor cores 110. For instance, the core controller 130 may provide the selection result SR to indicate that 3 more cores should be turned on, which is equivalent to a movement from S to A on path 1. Then, the core setting module 120 turns the cores 20, 30 and 40 on as illustrated in transition T1 of FIG. 3A.

For the DOP higher or equal to 4, a slightly different strategy that the core controller 130 might take is to turn on the cores 20 and 30 firstly, and then determine whether more cores need to be turned on (e.g. according to the utilization of the cores 10, 20 and 30), and turn on the core 40 if needed, which would correspond to a movement from S to A' (T2 of FIG. 3A) and then from A' to A (T3 of FIG. 3A) on path 1.

The core controller 130 may further determine whether the operating point A is suitable for the processor cores 110 (e.g. whether utilization of the processor cores 110 under operating point A is neither too high nor too low). If it is, the frequencies of the processor cores 110 remain at F1 and the power-on number of the processor cores 110 stays with 4. On the contrary (e.g. the utilization of the processor cores 110 under operating point A is still too high), the core controller 130 may select other operating points on path 1 by starting increasing the frequencies of the processor cores from F1 to at most F5, where the operating point M (under which the processor cores 110 exert maximum performance) is reached.

Figure 3B:
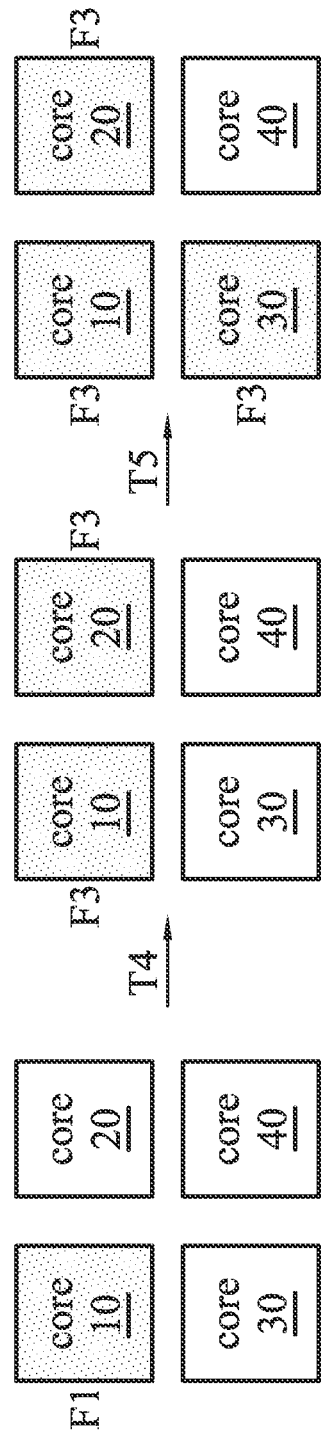

Please focus on path 2 of FIG. 2 in light of FIG. 3B. Path 2 shows another strategy of the core controller 130 for providing the selection result SR when the degree of parallelism DOP is among a certain range, i.e. when the degree of parallelism DOP is 2 or 3. Under such a circumstance, the core controller 130 may adjust the power-on number of the processor cores 110 before adjust the frequencies of the processor cores 110 and vice versa. For instance, the core controller 130 may provide the selection result SR to indicate that 1 more core should be turned on with the operating frequencies increased from F1 to F3, which is equivalent to a movement from S to B on path 2. Then, the core setting module 120 turns the core 20 on and sets the operating frequencies of the core 10 and 20 to F3 as illustrated in transition T4 of FIG. 3B.

If the operating point B is not enough for the processor cores 110 to smoothly executes the application program 160, the core controller 130 may provide the selection result SR to turn on one more core (i.e. core 30) while maintaining the operating frequencies of the cores 10, 20 and 30 at F3, which correspond to a move from B to B' on path 2 as also illustrated in transition T5 of FIG. 3B. As analogously described with respect to path 1, the operating point of the processor cores 110 may further move from B' along path 2 until the maximum performance operating point M has been reached.

Figure 3C:
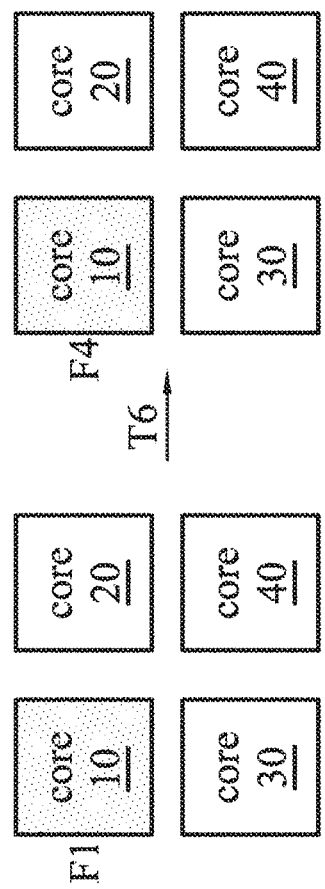

Path 3 of FIG. 2 together with FIG. 3C depict still another scenario that the core controller 130 provides the selection result SR. The core controller 130 may adopt path 3 as a selection result generation strategy when the degree of parallelism DOP of the application program 160 is one.

Under such scenario, the core controller 130 adjusts the frequencies of the processor cores 110 before adjusting the power-on number of the processor cores 110. For instance, the core controller 130 may provide the selection result SR to indicate that the operating frequency of the core 10 should be increased from F1 to F4, which is equivalent to a movement from S to C on path 3. In response, the core setting module 120 sets the operating frequency of the core 10 to F4 as illustrated in transition T6 of FIG. 3C. In one embodiment, the operating point C is suitable for the processor cores 110 to run the application program 160 and the process may stop here. As similarly described with regard to path 1 and path 2, the core controller 130 may "reluctantly" turn on additional cores along path 3 until reaching the maximum performance operating point M if increasing operating frequency alone is not enough to keep utilization of the core 10 within a proper region.

When provided with the selection result SR, the core setting module 130 changes at least one of the frequencies of the processor cores 110 and the power-on number of the processor cores 110 based on the selection result SR. For instance, if the selection result SR designates B as the operating point, the core setting module 130 turns core 10 and core 20 on as well as sets the operating frequencies of these two cores as F3.

Thus, below shows some embodiments of the invention. The core controller 130 selects, according to the degree of parallelism DOP of the application program 160, at least one of the frequencies of the processor cores 110 and the power-on number of the processor cores 110 to provide the selection result SR when determining that the frequencies of the processor core 110 or the power-on number of the processor cores 110 should be changed. The core controller 130 provides the selection result SR by doing the following. Firstly: obtain, according to the degree of parallelism DOP of the application program 160, a control path (e.g. path 1, path 2 or path 3) on a 2-dimensional (2D) coordinate, wherein a first axis of the 2D coordinate (the y-axis of FIG. 2) represents the frequencies of the processor cores 110 and a second axis of the 2D coordinate (the x-axis of FIG. 2) represents the power-on number of the processor cores 110. Secondly, provide the selection result SR based on the control path, wherein the control path shifts toward the second axis (shifts away from path 3 to approach path 1) of the 2D coordinate as the degree of parallelism DOP of the application program 160 increases. The core setting module 120 changes at least one of the frequencies of the processor cores 110 and the power-on number of the processor cores 110 in a way that corresponds to a movement along the control path (e.g. from S to A along path 1). The core setting module 120 increases the power-on number of the processor cores 110 at most by N (e.g. 3) when a current power-on number of the processor cores is less than the degree of parallelism DOP of the application program 160 by N (e.g. DOP is 4 and currently only core 10 is power-on), wherein N is a positive integer greater than one.

Compared with conventional multi-core management scheme where usually cores are turned on one after another (i.e. only one additional core turned on for each adjustment), embodiments of the invention above provide more flexible and strategic ways for multi-core management.

Figure 4:
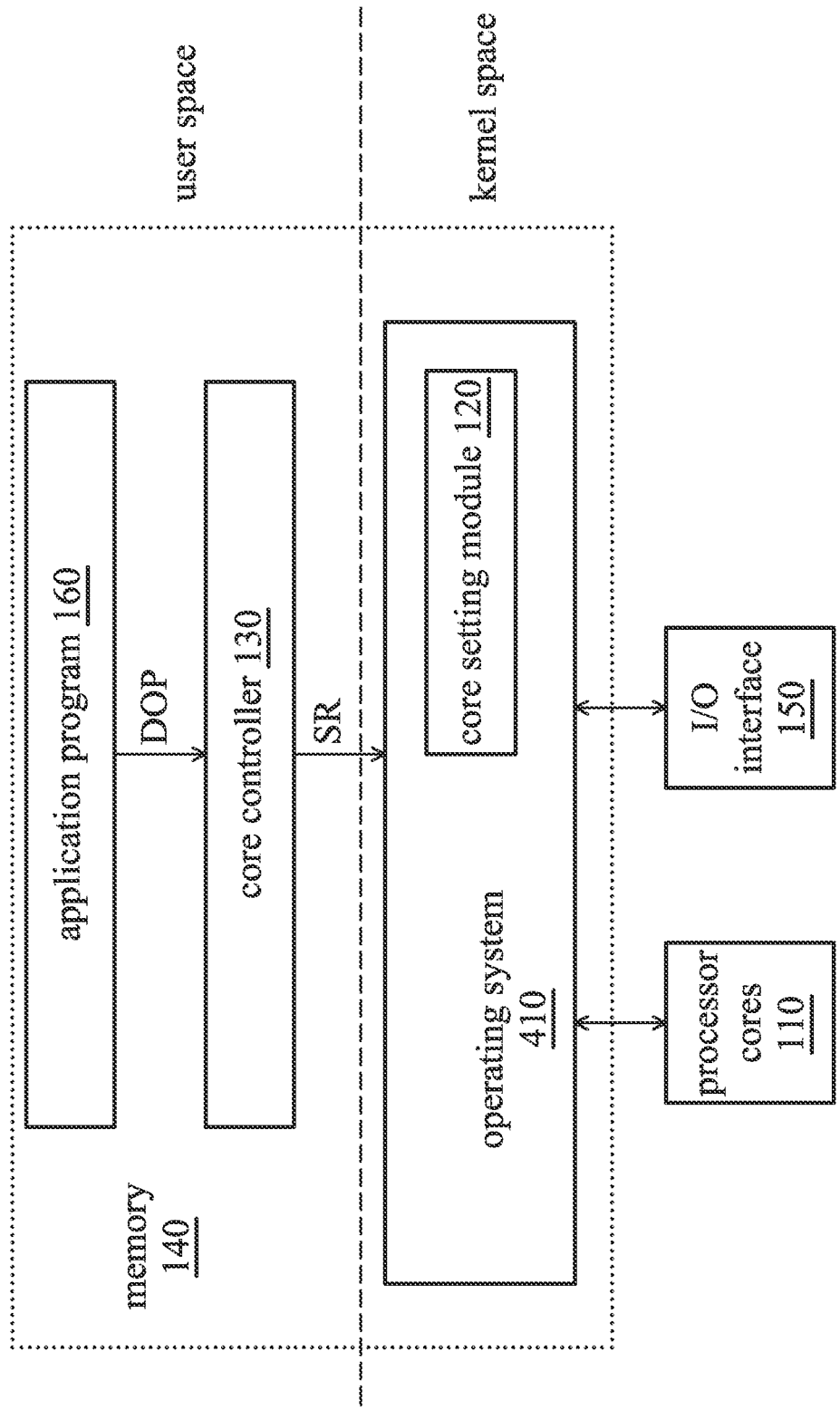
FIG. 4 gives a software implementation of a core controller and a core setting module according to another embodiment of the invention.

FIG. 4 gives a software implementation of the core controller 130 and the core setting module 120 according to an embodiment of the invention. Referring to FIG. 4, there is shown an implementation of the electronic device 100 described above with respect to FIG. 1. The electronic device 100 can include several hardware components such as the processor cores 110, the memory 140 and the User interface 150. Running on the electronic device 100 can be one or more software components such as the operating system 410, the core controller 130 and the application program(s) 160.

The processor cores 110 can include one or more central processing unit (CPU) cores that are operable to carry out the instructions of a program or application by performing arithmetical, logical, and input/output operations. Both the operating frequencies of the processor cores 110 and on/off number of the processor cores 110 can be dynamically adjusted.

The memory 140 can include one or more memory circuits such as one or more of dynamic random access memory (DRAM), static random access memory (SRAM), double data rate synchronous DRAM (DDR SDRAM), and/or other types of memory circuits. The memory 140 can be connected to other hardware components such as the processor cores 110 and the User interface 150 through one or more memory buses. The software components such as the operating system 410 and the application program(s) 160 are run on the memory 140.

The operating system 410 can include software that is used to manage the various hardware resources of the electronic device 100. The operating system 410 can also be used to provide common services to computer programs such as the application program(s) 160. The operating system 410 tends to act as an intermediary between the hardware components and the application program(s) 160.

The application program(s) 160 can include one or more software applications that help a user perform specific tasks. To perform a task (e.g. web browsing, video playback), the application program(s) 160 can access the processor cores 110 through the operating system 410.

The core controller 130 can be a software program that contains some instructions for adjusting power and performance of the processor cores 110. Specifically, the core controller 130 monitors the degree of parallelism DOP of the application program(s) 160. Then, the core controller 130 determines whether frequencies of the processor cores 110 or power-on number of the processor cores 110 should be changed according to utilization of the processor cores 110. The core controller 130 provides the selection result SR according to the degree of parallelism DOP of the application program(s) 160 when determining that the frequencies of the processor cores 110 or the power-on number of the processor cores 110 should be changed, where the selection result SR suggests how at least one of the frequencies of the processor cores 110 and the power-on number of the processor cores 110 should be adjusted.

The selection result SR is sent to the core setting module 120, which can be a portion of the operating system 410. The core setting module 120 changes at least one of the frequencies of the processor cores 110 and the power-on number of the processor cores 110 according to the selection result SR.

In one embodiment, the core setting module 120 is a part of the kernel of the operating system 410. In other words, the core setting module 120 is in a kernel space where computer programs cannot be changed by a user. In contrast, the core controller 130 may be a computer program in a user space, where the user is able to change through coding if necessary. The core controller 130 is thus more flexible from programming perspective as a programmer may reconfigure it according to needs.

Figure 5:
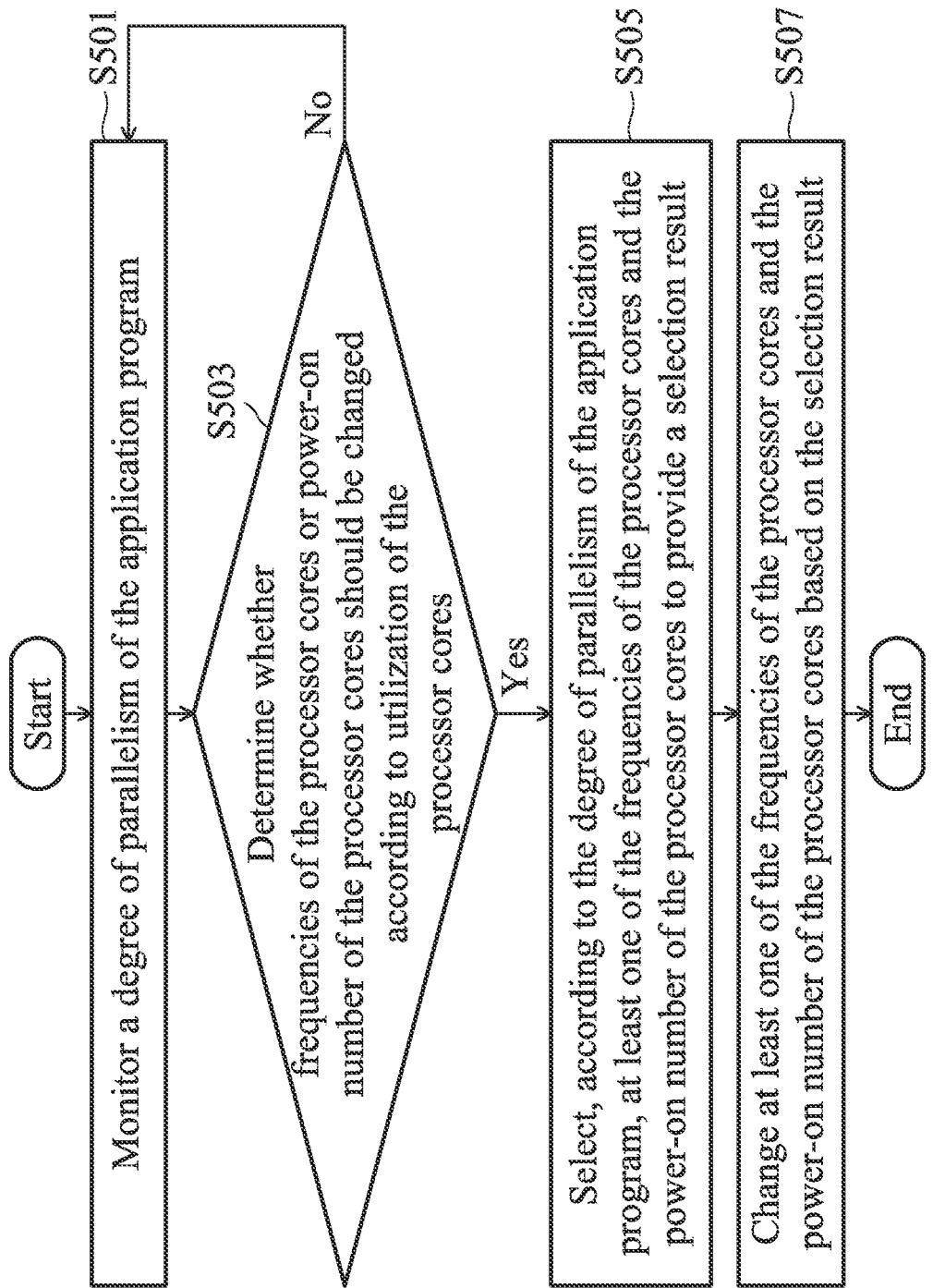
FIG. 5 is a flow chart illustrating a method for controlling operating of a plurality of processor cores in an electronic device according to some other embodiment of the invention.

FIG. 5 is a flow chart illustrating a method for controlling operation of a plurality of processor cores according to an embodiment of the invention. An application program is run on the processor cores. In step S501, a degree of parallelism of the application program is monitored. In step S503, it is determined whether frequencies of the processor cores or power-on number of the processor cores should be changed according to utilization of the processor cores. If no, the determination may be performed again after certain period of time. If yes, at least one of the frequencies of the processor cores and the power-on number of the processor cores is selected according to the degree of parallelism of the application program to provide a selection result (step S505). In step S507, at least one the frequencies of the processor cores and the power-on number of the processor cores is changed based on the selection result.

The method in FIG. 5 may be performed by hardware (e.g., circuitry, dedicated logic, programmable logic, microcode, application specific integrated circuits (ASICs), field-programmable gate arrays (FPGAs), etc.), software (e.g., instructions run on a processing device), or a combination thereof. In one embodiment, the method is performed by the core controller 130 and the core setting module 120 in the electronic device 100 of FIGS. 1 and 4.

The operations of the flow diagram of FIG. 5 have been described with reference to the exemplary embodiments of FIGS. 1 and 4. However, it should be understood that the operations of the flow diagrams of FIG. 5 can be performed by embodiments of the invention other than those discussed with reference to FIGS. 1 and 4, and the embodiments discussed with reference to FIGS. 1 and 4 can perform operations different than those discussed with reference to the flow diagrams. While the flow diagrams of FIG. 5 show a particular order of operations performed by certain embodiments of the invention, it should be understood that such order is exemplary (e.g., alternative embodiments may perform the operations in a different order, combine certain operations, overlap certain operations, etc.).

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device comprising:
a plurality of processor cores configured to execute an application program;
a core controller configured for:

monitoring a degree of parallelism of the application program;

determining, according to utilization of the processor cores, whether frequencies of the processor cores or power-on number of the processor cores should be changed; and selecting, according to the degree of parallelism of the application program, at least one of the frequencies of the processor cores and the power-on number of the processor cores to provide a selection result when determining that the frequencies of the processor cores or the power-on number of the processor cores should be changed; and a core setting module for changing at least one of the frequencies of the processor cores and the power-on number of the processor cores based on the selection result, wherein the core controller provides the selection result by:

obtaining, according to the degree of parallelism of the application program, a control path on a 2-dimension (2D) coordinate, wherein a first axis of the 2D coordinate represents the frequencies of the processor cores and a second axis of the 2D coordinate represents the power-on number of the processor cores; and providing the selection result based on the control path.

2. The electronic device of claim 1, wherein the core setting module changing at least one of the frequencies of the processor cores and the power-on number of the processor cores corresponds to a movement along the control path.

3. The electronic device of claim 1, wherein the control path shifts toward the second axis of the 2D coordinate as the degree of parallelism of the application program increases.

4. The electronic device of claim 1, wherein the core setting module increases the power-on number of the processor cores at most by N when a current power-on number of the processor cores is less than the degree of parallelism of the application program by N, wherein N is a positive integer greater than one.

5. The electronic device of claim 1, wherein the core controller determines that the frequencies of the processor cores or the power-on number of the processor cores should be changed when the utilization of the processor cores is above a predefined threshold.

6. The electronic device of claim 1, wherein the core controller is a program in user space.

7. The electronic device of claim 6, wherein the core setting module is a program in kernel space.

8. A method for controlling operation of processor cores within an electronic device, wherein an application program is run on the processor cores, the method comprising:

monitoring a degree of parallelism of the application program;

determining whether frequencies of the processor cores or power-on number of the processor cores should be changed according to utilization of the processor cores;

selecting, according to the degree of parallelism of the application program, at least one of the frequencies of the processor cores and the power-on number of the processor cores to provide a selection result when determining that the frequencies of the processor cores or the power-on number of the processor cores should be changed; and changing at least one of the frequencies of the processor cores and the power-on number of the processor cores based on the selection result, wherein at least one of the frequencies of the processor cores and the power-on number of the processor cores are selected according to the degree of parallelism of the application program to provide the selection result by:

obtaining, according to the degree of parallelism of the application program, a control path on a 2-dimension (2D) coordinate, wherein a first axis of the 2D coordinate represents the frequencies of the processor cores and a second axis of the 2D coordinate represents the power-on number of the processor cores; and providing the selection result based on the control path.

9. The method of claim 8, wherein at least one of the frequencies of the processor cores and the power-on number of the processor cores is changed corresponding to a movement along the control path.

10. The method of claim 8, wherein the control path shifts toward the second axis of the 2D coordinate as the degree of parallelism of the application program increases.

11. The method of claim 8, wherein the power-on number of the processor cores is increased at most by N when a current power-on number of the processor cores is less than the degree of parallelism of the application program by N, wherein N is a positive integer greater than one.

12. The method of claim 8, wherein it is determined that the frequencies of the processor cores or the power-on number of the processor cores should be changed when the utilization of the processor cores is above a predefined threshold.

13. A non-transitory computer-readable storage medium storing therein a control program, the control program causing an electronic device, which includes a plurality of processor cores for running an application program, to execute a process comprising:

monitoring a degree of parallelism of the application program;

determining whether frequencies of the processor cores or power-on number of the processor cores should be changed according to utilization of the processor cores;

selecting, according to the degree of parallelism of the application program, at least one of the frequencies of the processor cores and the power-on number of the processor cores to provide a selection result when determining that the frequencies of the processor cores or the power-on number of the processor cores should be changed; and changing at least one of the frequencies of the processor cores and the power-on number of the processor cores based on the selection result, wherein at least one of the frequencies of the processor cores and the power-on number of the processor cores are selected according to the degree of parallelism of the application program to provide the selection result by:

obtaining, according to the degree of parallelism of the application program, a control path on a 2-dimension (2D) coordinate, wherein a first axis of the 2D coordinate represents the frequencies of the processor cores and a second axis of the 2D coordinate represents the power-on number of the processor cores; and providing the selection result based on the control path.

\* \* \* \* \*